United States Patent [19]

Habiger et al.

[11] Patent Number: 5,374,355
[45] Date of Patent: Dec. 20, 1994

[54] FILTER FOR FUELS OR LUBRICANTS OF AN INTERNAL COMBUSTION ENGINE

[75] Inventors: Heinz Habiger, Ludwigsburg; Herbert Jainek, Heilbronn; Reinhard Oelpke, Bietigheim-Bissingen; Erich Poldner, Steinheim, all of Germany

[73] Assignee: Filterwerk Mann & Hummel GmbH, Ludwigsburg, Germany

[21] Appl. No.: 992,825

[22] Filed: Dec. 16, 1992

[30] Foreign Application Priority Data

Dec. 17, 1991 [DE] Germany .................... 4141521

[51] Int. Cl.⁵ .................. B01D 27/06; B01D 27/08
[52] U.S. Cl. .................... 210/440; 210/441; 210/450; 210/493.2; 210/DIG. 17
[58] Field of Search .............. 210/132, 136, 248, 440, 210/450, 456, 457, 493.2, 130, 429, 430, 437, 438, 441, 443, 444, DIG. 17, 493.5; 137/543.19

[56] References Cited

U.S. PATENT DOCUMENTS

| 2,605,904 | 8/1952 | Ogilvie | 210/132 |
|---|---|---|---|
| 2,642,187 | 6/1953 | Bell | 210/493.2 |
| 2,642,188 | 6/1953 | Layte et al. | 210/450 |
| 2,801,006 | 7/1957 | Hultgren et al. | 210/438 |
| 3,807,561 | 4/1974 | Cullis | 210/130 |

FOREIGN PATENT DOCUMENTS

| 828543 | 12/1969 | Canada | 210/136 |
|---|---|---|---|
| 1302126 | 7/1962 | France | 210/136 |
| 2235837 | 1/1974 | Germany | 210/136 |
| 3429634 | 2/1986 | Germany . | |
| 3738718 | 7/1988 | Germany | 210/440 |
| 1355832 | 6/1974 | United Kingdom | 210/440 |
| 1477450 | 5/1989 | U.S.S.R. | 210/136 |

Primary Examiner—Matthew O. Savage
Attorney, Agent, or Firm—Evenson, McKeown, Edwards & Lenahan

[57] ABSTRACT

A filter for fuel and/or lubricants of an internal combustion engine is described. This filter consists of a base plate which can be fastened to a threaded nipple, a cover which is releasably fastened to the base plate, and a support tube disposed on the cover or base plate. A filter cartridge is slipped over the support tube and consists of a cylinder-shaped filter insert and nonmetallic end plates. This filter cartridge is in contact with a sealing means on the base plate and an additional sealing means on the cover. Replacement of the entire filter is not necessary, with only the filter cartridge requiring replacement at specified intervals of time.

2 Claims, 11 Drawing Sheets

FILTER FOR FUELS OR LUBRICANTS OF AN INTERNAL COMBUSTION ENGINE

BACKGROUND OF THE INVENTION

The invention relates to a filter for fuels and/or lubricants of an internal combustion engine.

German published Patent Application No. DE 3,429,634 discloses a filter for fuels and/or lubricants. The disclosed filter consists of a housing containing a filter cartridge, which is closed by a cover. The filter cartridge is bonded at one end to the cover and at the other to the base of the housing by a layer of adhesive. Such filters must be removed after certain time intervals and replaced with a new filter.

The disposal of such filters, which are also termed replaceable filters, especially for the filtration of oil in a motor vehicle, presents increasing difficulties.

Such a filter consists of components of different materials, such as a sheet metal case, a steel cover, pleated filter paper and various plastic parts. Furthermore, after use the filter still contains a residue of oil which cannot be removed from the filter. Since the recovery of wastes has priority over conventional waste disposal, if recovery is technically practicable and the substances obtained are reusable, there is a need to take such complete filters apart and dispose of the components separately. This procedure, however, is quite complicated; furthermore, considerable amounts of recycling material are produced.

The invention addresses the problem of creating a filter in which the disadvantages described will be avoided, and which has good characteristics for recycling.

SUMMARY OF THE INVENTION

The principal objective of the invention is to permit the filter case to be opened and closed, in order thus to be able to remove the filter insert and to replace only the filter insert, which consists essentially of filter paper.

This objective is accomplished by providing a base plate adapted to be secured to a stationary nipple, a cover releasably joined to the base plate, a support tube mounted on the cover or the base plate, a cylindrical filter insert, arranged on the support tube and having first and second nonmetallic end plates, a first sealing element on the base plate and contacting the first end plate of the filter insert, and a second sealing element in contact with the second end plate of the filter element.

In one embodiment of the invention, provision is made for joining a support tube directly to the base plate or to the cover part. The filter cartridge is placed over this support tube. It serves on the one hand for fixing the filter insert in place, and on the other hand as a means for supporting the filter insert against pressure differences between the pressure on the raw liquid side and the pressure on the clean liquid side.

Advantageously, the base plate is similar to a replaceable filter base plate. This has the advantage that the socket of a replaceable filter holder does not need to be modified if the filter in accordance with the invention is used in place of a replaceable filter.

According to a further development of the invention, the releasable connection between the cover part and the base plate can be a simple threaded connection or a bayonet coupling. If the thread on the cover part is an internal thread, it can be segmented along its circumference for ease of manufacture; this means that only certain segment areas are provided with threads. In the case of a cover part made by injection molding from plastic, such a thread can be made to special advantage by providing the injection molding die with a tapered shaft which reaches into the interior of the cover part and by providing longitudinal slides with the thread shapes on this tapered shaft.

When the cover part is stripped out, first the tapered shaft is withdrawn and then the longitudinal slide is moved inwardly, thus releasing the cover part.

In another aspect of the invention, the support tube on the mounting side is provided with a collar. This collar is made in a raised shape so as to form a sealing means for the end plate of the filter insert that faces this sealing means. This avoids the use of an additional sealing means, such as sealing rubber, an O-ring, or the like.

In many filters a liquid or oil drain hole is desirable, through which, when the filter insert is removed, any oil still in the filter case can drain out. Of course, when the filter insert is installed, this oil drain must be sealed shut. According to a further development of the invention, the end plate or end face of the filter cartridge is provided for this purpose. This end plate seals the oil drain hole. As soon as the filter cartridge is taken out of the case, the end plate uncovers this oil drain hole.

Advantageously, the interior of the support tube can be used for containing a by-pass valve. This by-pass valve can be preceded by a coarse filter in the form of a sieve or a screen plate. This coarse filter prevents any highly contaminated raw liquid from being fed into the clean liquid area.

In a number of applications the filter is in a hanging arrangement, i.e., the cover part points approximately in the direction of the gravity line. In this arrangement it is desirable before opening the filter to let the oil present in the filter drain out. This is accomplished by providing an oil drain screw on the cover part, which first has to be opened, and from which the oil contained in the filter can drain out.

In a further development the sealing means on the base plate is provided with a surge plate. The purpose of this surge plate is to deflect the entering oil so as to prevent the filter insert from being destroyed at this point by the high oil pressure, and to prevent any undesirable lifting of the filter cartridge from its seat.

The filter according to the invention is characterized also by the fact that not only can the cover part be removed to replace the filter insert, but also it is possible to unscrew the entire filter from a threaded nipple in order to replace a defective part, for example. When the cover part is removed, to prevent the entire filter from being removed with it, the base plate is fastened self-lockingly on the nipple and can be removed from the nipple only by applying a great force or by means of a wrench.

These and other features of preferred further developments of the invention will be found not only in the claims but also in the description and the drawings, while the individual features can be embodied each by itself or severally in the form of sub-combinations in the embodiment of the invention and in other fields, and can constitute patentable embodiments by themselves, for which protection is hereby claimed.

Embodiments of the invention are represented in the drawings and further explained hereinbelow.

DETAILED DESCRIPTION OF THE PREFERRED EMBODIMENTS

Figure 1:
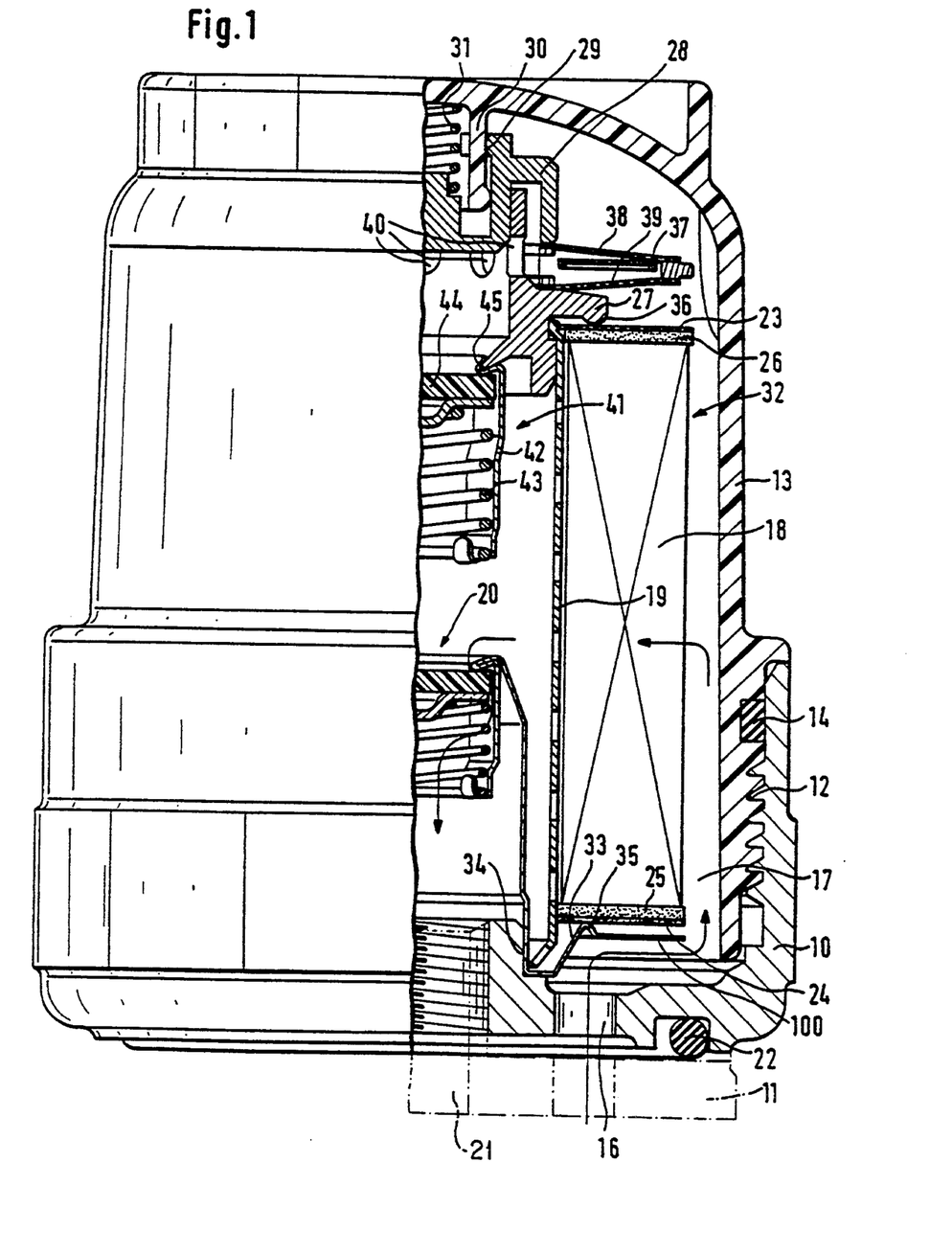
FIG. 1 is a partial section taken through an oil filter with a disposable cartridge.

FIG. 1 shows an oil filter such as is used, for example, for cleaning motor oil in motor vehicles. The oil filter consists of a base plate 10 which is screwed onto a threaded nipple 11. The cover 13 of the filter is screwed onto this base plate by means of a sawtooth thread 12 formed on the cover 13 of the filter. To seal the entire case, a gasket 14 is provided at the end of the thread 12. The base plate 10 consists, for example, of aluminum, and the cover 13 is a plastic injection molding. The oil to be cleaned flows through the bore 16 in base plate 10 into the raw liquid chamber 17, then through a pleated filter insert 18. The oil in cleaned condition leaves the filter through a support tube 19 and a check valve 20, and enters the central bore 21 of the nipple.

To seal off the raw liquid chamber between the base plate and the nipple from the exterior a sealing means 22 is provided. The filter insert 18 is a pleated filter insert made of paper or nonwoven material, which has at both ends an end ring 23, 24, which consists, for example, of cardboard. The end rings are bonded to the filter insert 18 with cement 25, 26. The filter insert is slipped over the support tube 19. This support tube is, for example, a perforated sheet metal tube which is crimped onto a holder 27. The holder 27 is affixed to an intermediate piece 28. The intermediate piece 28 is snap-fastened at 29 onto a cylindrical projection 30 of the cover 13, while a compression spring 31, which, by thrusting at one end against the cover 13 and at the other end against the intermediate piece 28, exerts an axial force on the holder 27 to keep the entire filter cartridge 32 sealingly between the holder 27 and a sealing plate 33.

The sealing plate 33 is a piece shaped from sheet metal which is fastened to a cylindrical projection 34 of the base plate 10. This sealing plate 33 with its bead 35 seals directly against the end plate 24. On the opposite end of the filter cartridge 32 a marginal bead 36 is provided on the holder 27 for sealing the holder against the end plate 23. Between the holder 27 and the intermediate piece 28 there is provided a sieve ring filter 37 with sieve rings 38, 39. Bores 40 are disposed on the holder 27 inside of the sieve ring filter. If the resistance to flow in the filter cartridge 32 should increase too greatly because it has become fully loaded, or if the oil should not flow sufficiently through the filter cartridge in the cold operating condition, oil will then be able to bypass the filter cartridge 32 through the sieve ring filter 37, the bores 40, a bypass valve 41 and check valve 20.

The bypass valve 41 is adjusted so that it opens only at a specific differential pressure between the raw oil side and the clean oil side. It is set, for example, at 2.5 bar. This prevents incompletely clean liquid from entering through the sieve ring filter 37 into the clean liquid area, even in normal operating conditions.

The bypass valve 41 consists of a sheet-metal case 42 which is crimped onto the holder 27 and in which a valve spring 43 urges a valve plate 44 sealingly against the valve seat 45.

The check valve 20 is constructed in a similar manner, although in this case the opening pressure is substantially lower, for example, to 0.1 bar. This check valve serves the purpose of preventing the oil passages in the motor from emptying when the motor is not running.

To replace the filter cartridge 32, the cover 13 is unscrewed from the base plate 10. On the removed cover 13 is the holder 27 as well as the intermediate piece 28 and the support tube 19 bearing the filter cartridge 32. The filter cartridge can be pulled off from the support tube and replaced with a new filter cartridge. After the replacement of the filter cartridge the cover 13 is screwed back onto the base plate 10. The used filter cartridge 32 can be incinerated. Due to the use of end plates of cardboard and the employment of filter paper, no separation of the individual components is necessary, as it would be if metal end plates were used.

In the rest of the figures filters of similar construction are illustrated. To avoid repetition, a description will be given only of the essential features and those differing from the embodiment already described.

Figure 1A:
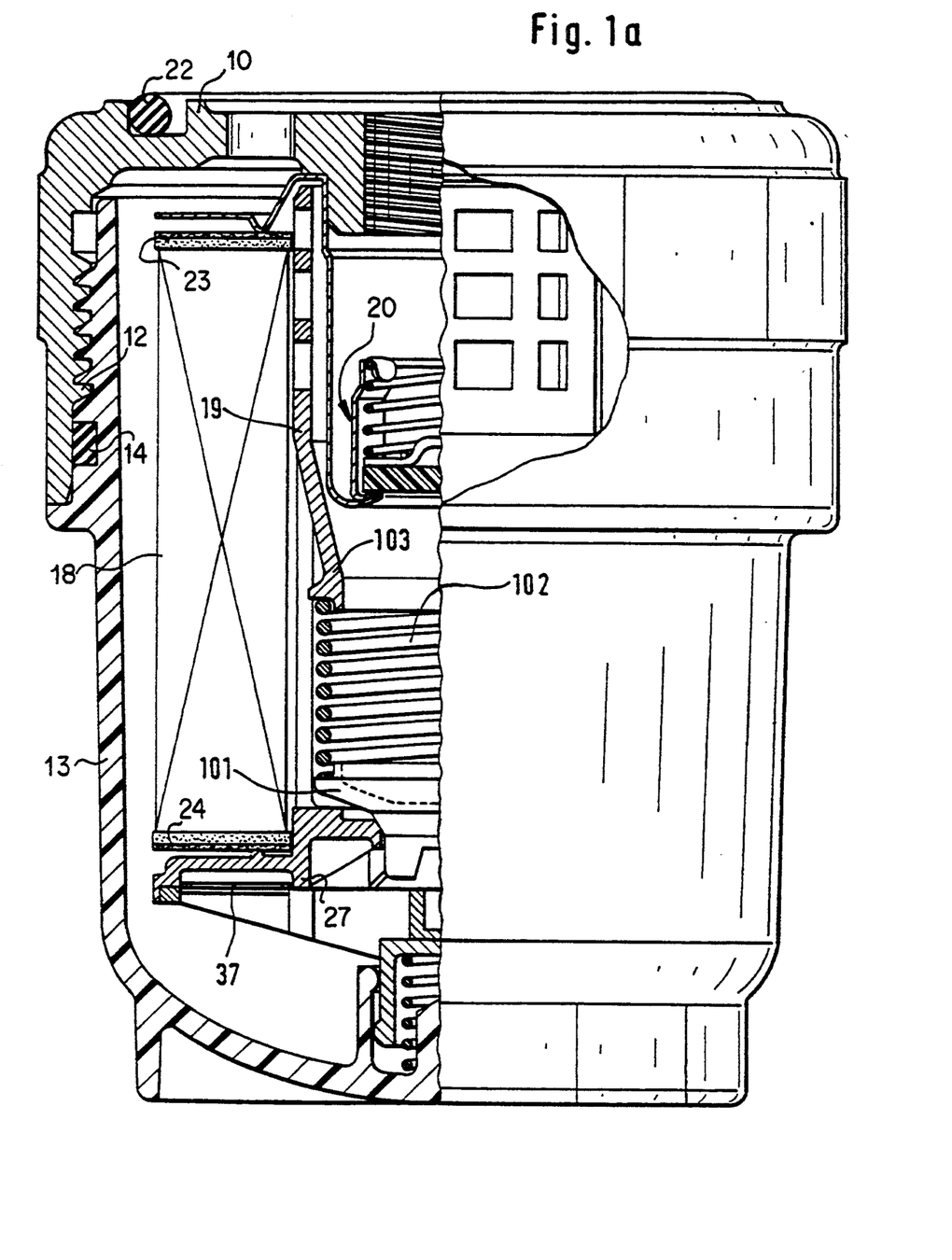
FIG. 1a is a partial section through an oil filter with disposable cartridge.

FIG. 1a shows an oil filter, the main parts of which are constructed similar to those of the oil filter of FIG. 1. The two saw-tooth threads 12 of the cover 13 of the filter are screwed onto a base plate 10. In order to seal the entire housing a seal 14 is provided at the end of the threads 12. The base plate 10 is formed, for example, of aluminum; the cover 13 is an injection molded plastic part.

Inside the oil filter a filter insert 18 folded in the form of a star is pushed over a supporting tube 19. Inside the supporting tube 19 there is a check valve 20. In order to seal the space for the dirty (unfiltered) liquid between the base plate and the supporting part with respect to the surrounding environment, a sealing element 22 is provided. The filter unit 18 is provided at both of its end faces with an end plate 23, 24. The supporting tube 19 is connected to the spring 102 via arresting hooks 103. The spring is supported against a valve body 101 which, together with the spring and the support part 27, form an overpressure (pressure relief) valve, which opens when the pressure difference between the unfiltered oil side and the filtered oil side becomes too great, so that unfiltered oil can flow into the filtered oil area. The support tube 19 and the sieve plate 37 both form a subassembly with the support part 27. This subassembly is integrated in the cartridge bypass valve, consisting of the valve body 101 and the pressure spring 102, whereby the arresting hooks 103 serve to connect the support tube 19 with the other parts just mentioned.

Figure 1B:
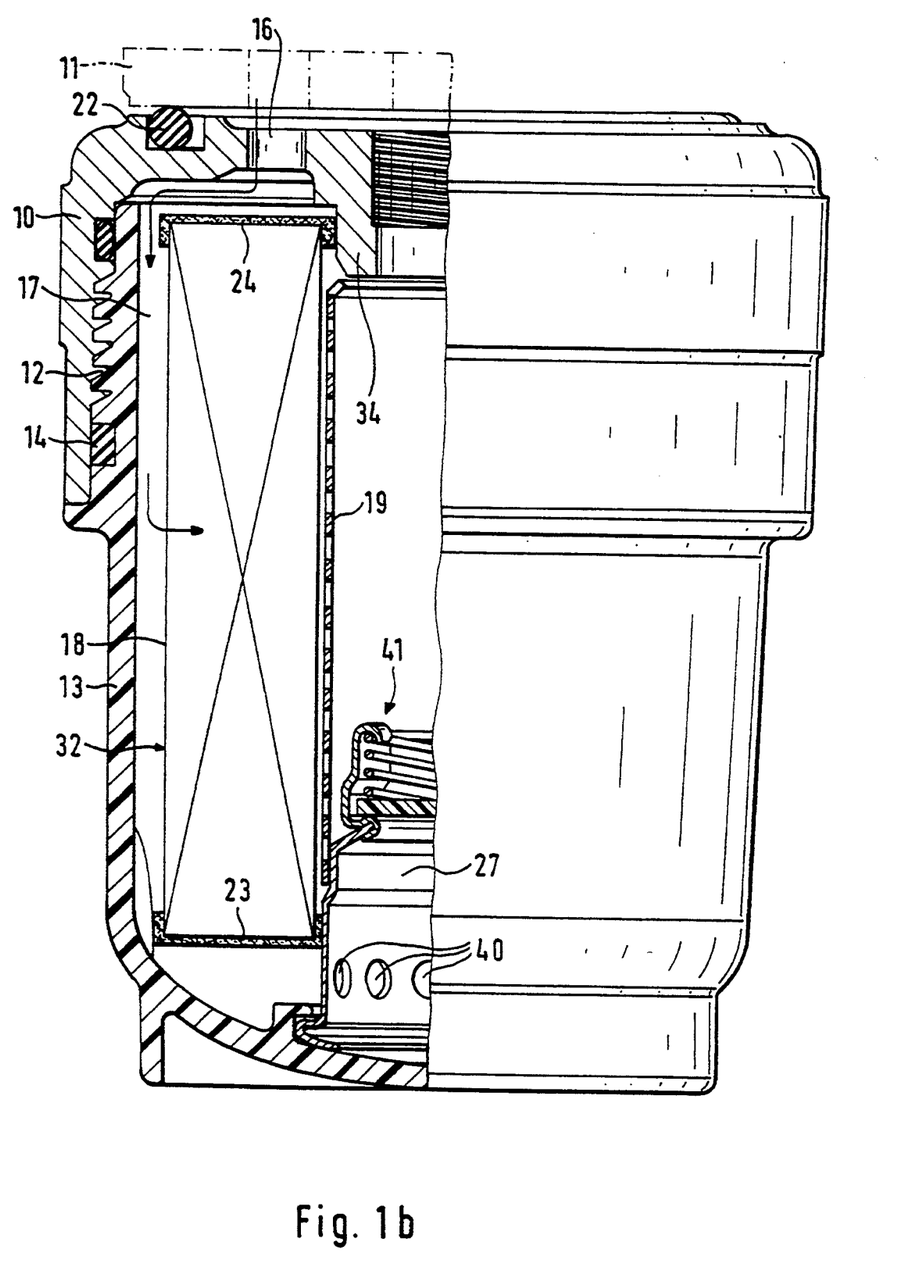
FIG. 1b is a partial section through an oil filter embodiment with a radial seal.

The oil filter embodiment shown in FIG. 1b comprises a filter insert 18 having end plates 23, 24 which not only cover the end faces, but also each comprise an axially extending, integral flange portion which covers a small portion of the axial extent of the filter insert 18. In this portion, the end plates 23, 24 serve a sealing function. End plate 24 lies adjacent a projection 34 of the base plate and produces therewith a type of radial seal. Likewise, the end plate 23 lies adjacent a cylindrical portion of the support member 27 and also serves a sealing function here. This radial seal has the advantage that the tolerances for the length of the filter insert 18 are not critical for the operation of the filter. The cylindrical support means in the embodiment of FIG. 1b comprises a projection 34 including a cylindrical unperforated portion attached to the base 10, and a cylindrical support member 27 including a perforated portion 19 adjacent projection 34 and an unperforated portion attached to the cover 13.

Figure 1C:
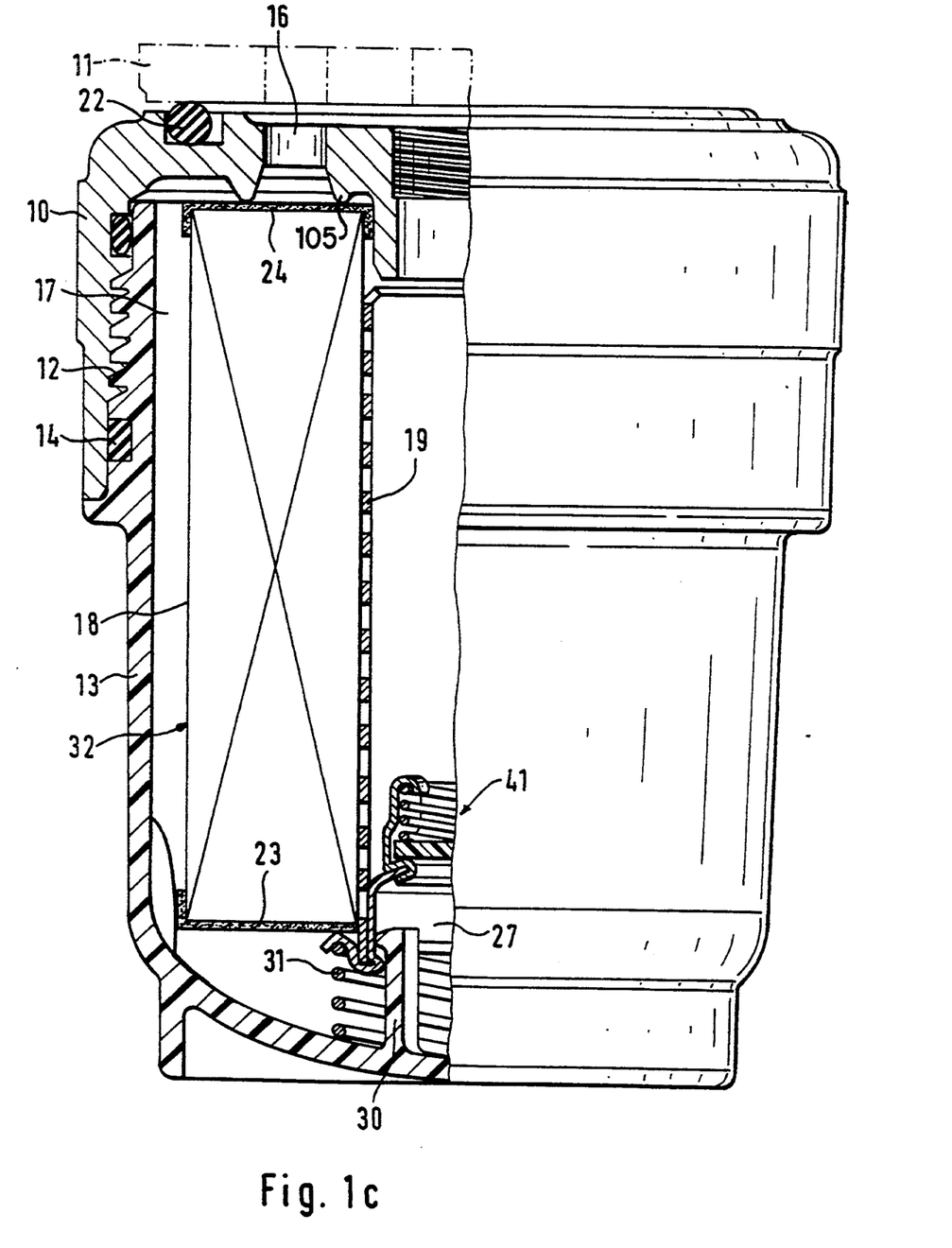
FIG. 1c is a partial section of an oil filter with a back-flow checkvalve.

FIG. 1c shows an oil filter in which the filter insert 18 serves the function of a check valve in conjunction with a spring 31. This spring 31 exerts an axially directed force on the filter insert 18 toward the base plate 10. The filter insert is arranged adjacent at least one annular bulge or hump 105 on the base plate 10. This annular hump surrounds the bore 16, through which the dirty oil is conveyed to the filter.

In normal operation, due to the pressure of the dirty oil, the filter insert 18 is lifted off the annular hump 105, thus opening the inlet for the dirty oil. As soon as the pressure of the dirty oil decreases, i.e. when an internal combustion engine stops, the end plate 24 closes off the bore 16 and prevents the oil in the filter from flowing backwards or running out of the filter. As in the FIG. 1b embodiment, the end plate 24 is configured to form a radial seal.

Figure 2A:
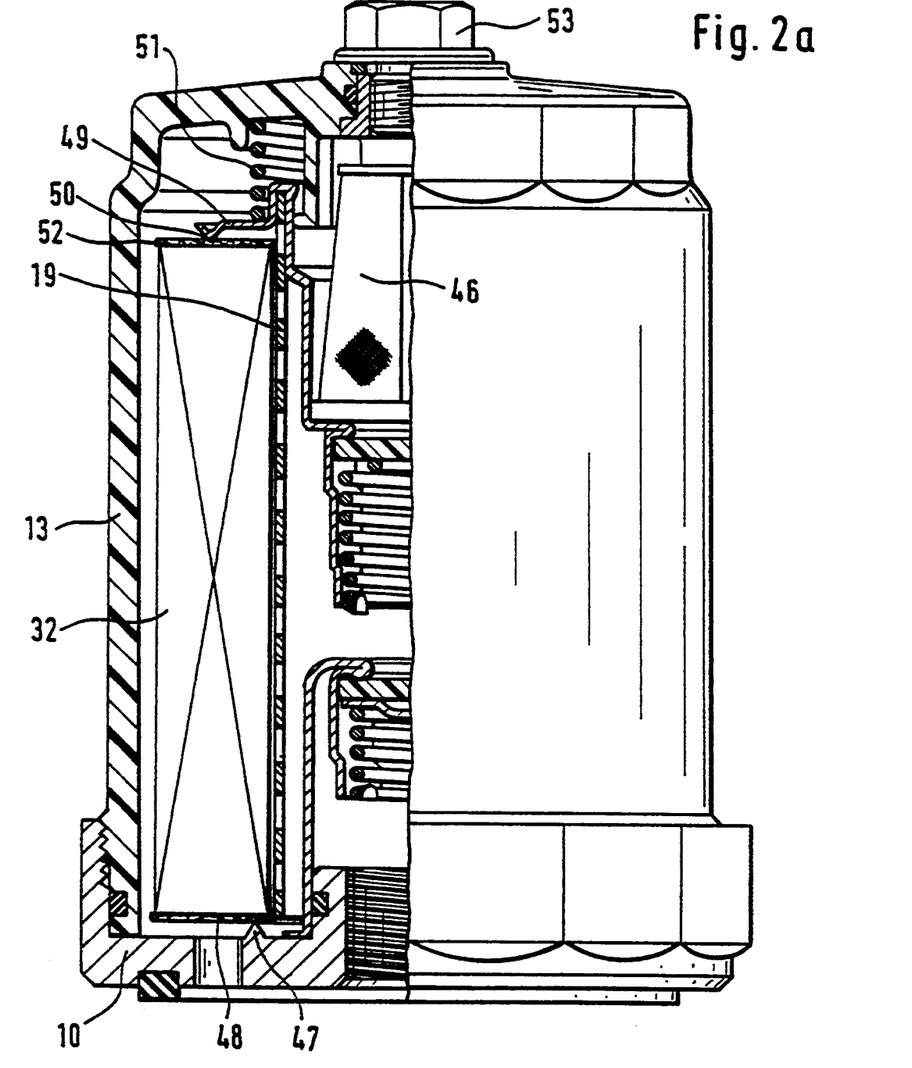
FIG. 2a is a partial section of an oil filter embodiment with an integrated sieve.

Instead of a sieve plate filter, the oil filter embodiment shown in FIG. 2a comprises a base plate 10 and a cover 13, and contains a strainer basket 46 which extends into the support tube 19. The base plate is provided with a circumferential sealing bead 47 on which lies the end plate 48 of the filter cartridge 32. At the opposite end of the filter cartridge 32 sealing is performed by means of a seal plate 49. This seal plate is provided with a bead 50. A compression spring 51 exerts a force against sealing plate 49 toward the filter cartridge, so that a reliable sealing of the end plate 52 against the bead 50 is assured. On the cover 13 there is provided a drain plug 53. The filter is normally installed in the inverted position. Before the cover is opened, this drain plug 53 can be removed and the oil contained in the filter case can first drain out. Then the cover is unscrewed from the base plate 10. The filter cartridge 32 can be removed and replaced with a fresh one.

Figure 2B:
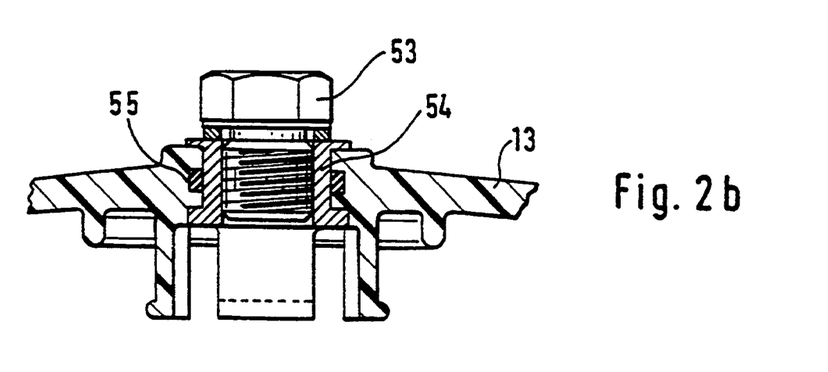
FIG. 2b is an enlarged sectional view of the top of the oil filter embodiment of FIG. 2a, FIG. 3 is a partial section of a further oil filter embodiment with an integrated sieve plate.

FIG. 2b shows a detail of the drain plug 53 on the cover 13. The cover 13, which consists of plastic, is provided with a bushing 54 with a hexagonal flange. This flange is crimped outwardly. To seal the bushing to the cover 13 a groove 55 is provided into which an O-ring is inserted. The drain plug 53 can, of course, also have an internal hexagonal head instead of an external hexagonal head.

Figure 3:
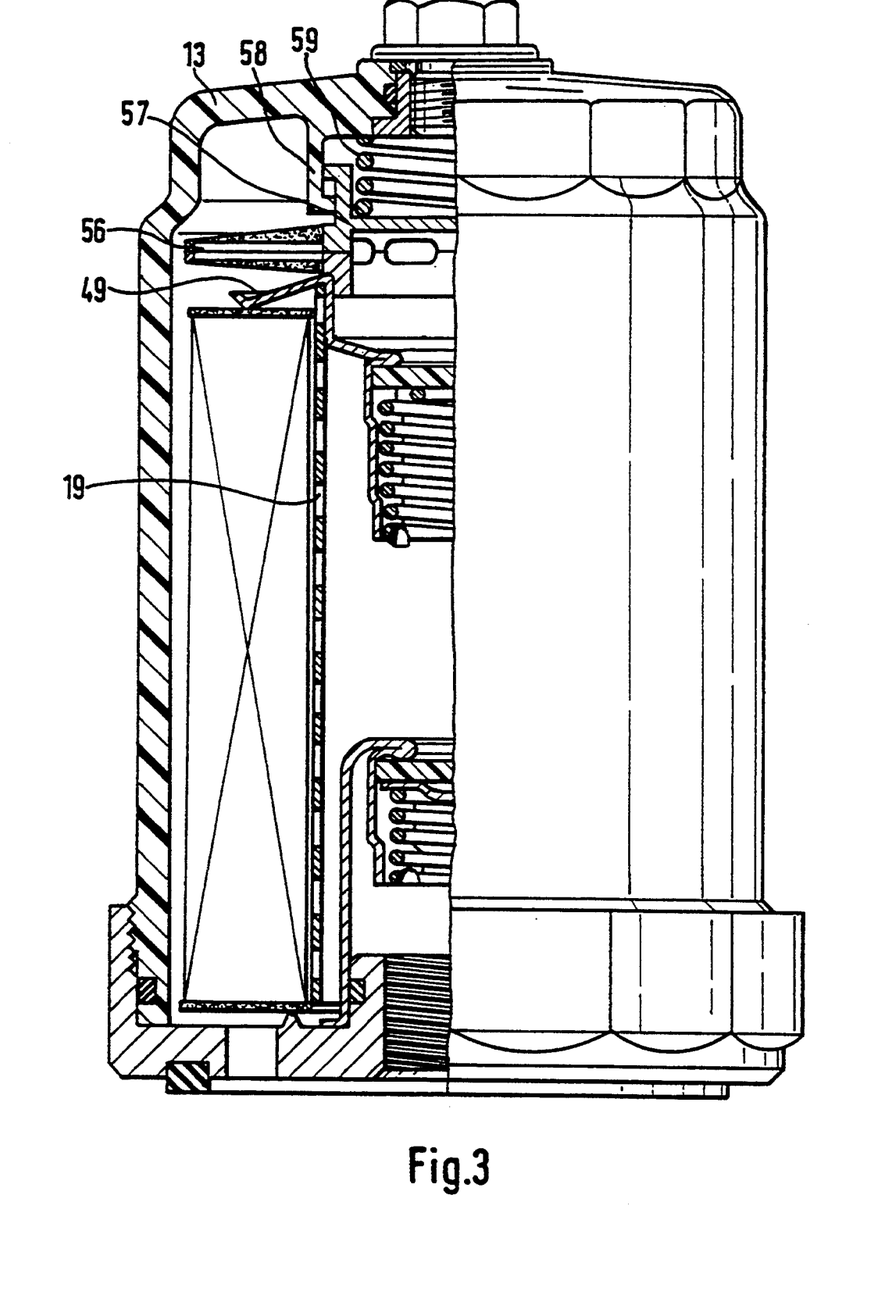

The FIG. 3 oil filter embodiment contains a sieve ring filter 56 similar to the sieve ring filter in FIG. 1. To produce pressure against the sealing plate 49, an intermediate element 57 is provided. The sieve ring filter as well as the sealing plate 49 and support tube 19 are fastened on this intermediate element 57. The intermediate element is held in a cylindrical projection 58 of the cover 13. Between the cover 13 and the intermediate element 57 is a compression spring 59.

Figure 4:
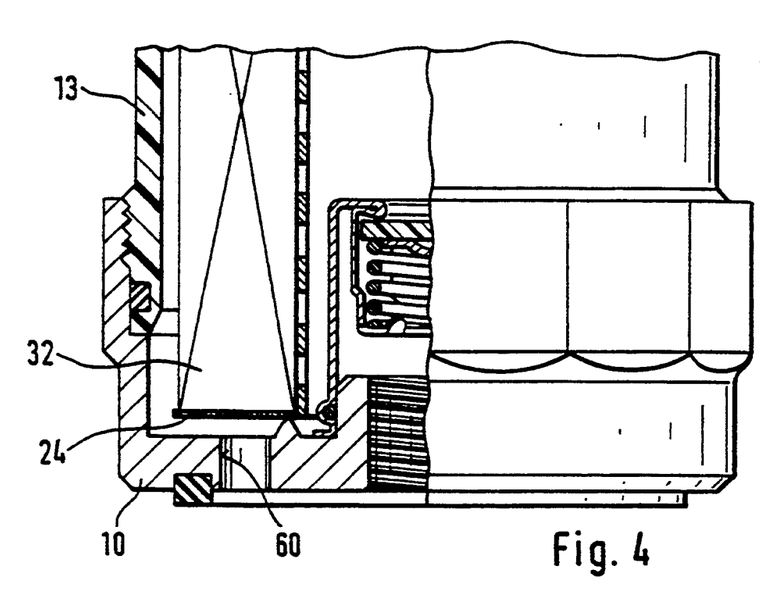
FIG. 4 is a partial section through an oil filter.

The oil filter embodiment illustrated in FIG. 4 comprises a filter cartridge 32 whose end plate 24 rests on an opening 60. This opening is an oil drain opening through which the oil in the filter case can drain when the cover 13 is removed from the base plate 10. During normal filter operation this opening 60 is closed by the end plate 24. On the basis of the sealing action of the end plate 24 no valve or additional sealing element is needed, therefore, at this point. The opening 60 leads directly back to the oil pan so as to permit the unhampered drainage of the oil.

Figure 5:
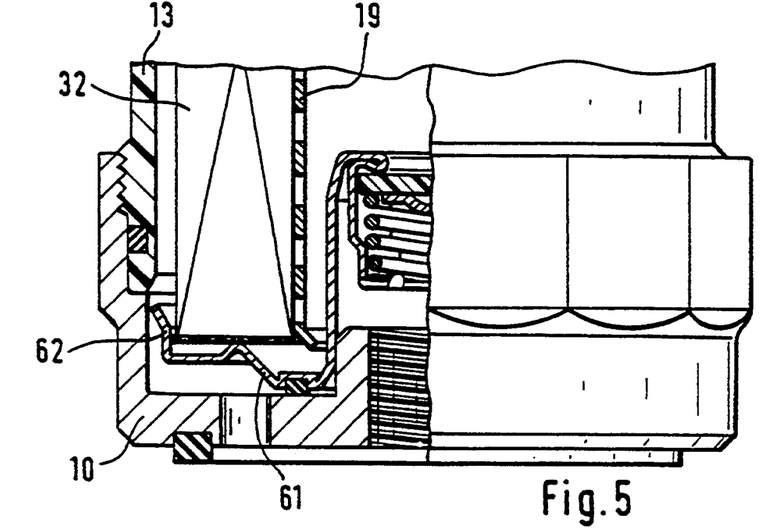
FIG. 5 is a partial section through an oil filter with cartridge centering.

The FIG. 5 embodiment illustrates centering means for the filter cartridge 32. A sealing plate 61 with a centering margin 62 is provided in the base plate 10. As above described, when the filter cartridge 32 is replaced the new filter cartridge 32 is screwed onto the base plate 10. It is advantageous if the filter cartridge 32 and supporting tube 19 are brought into the correct installed position by a centering margin 62.

Figure 6:
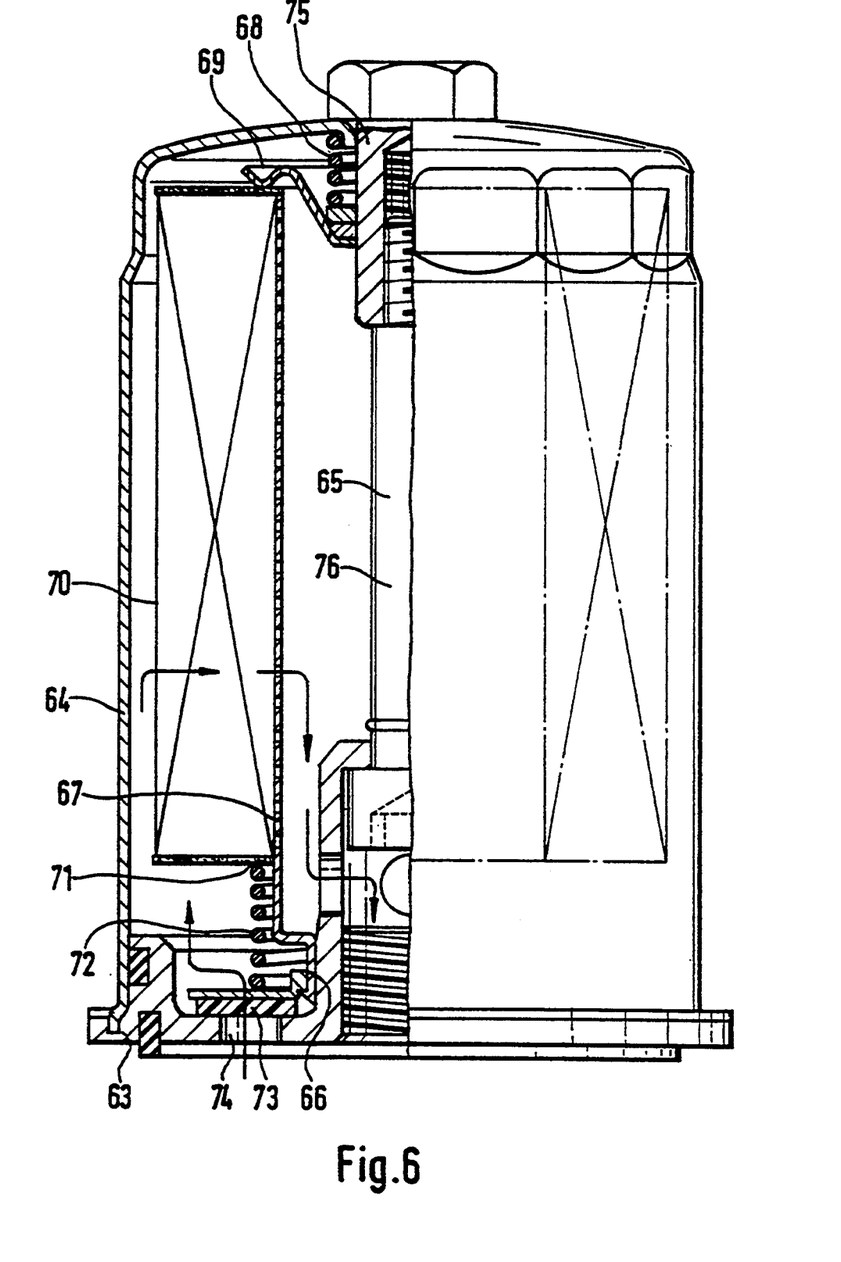
FIG. 6 is a partial section through a replaceable filter that can be opened.

FIG. 6 shows a section through a disposable filter which can be opened. Here a base plate 63 is provided on which a cover 64 is held by a central fastening screw 65. The center support tube 67 is fastened to a projecting rim 66. The filter cartridge 70 is slipped onto this center tube. The filter cartridge 70 is urged against the sealing surface 71 by the force of the spring 68 which acts on the sealing plate 69. A compression spring 72 is compressed below the sealing surface 71 and forms, in conjunction with a valve plate 73, a non-return valve for the inflow bore 74. A threaded attachment 75 is provided at the top of the cover 64. A center screw 76 is threaded into this attachment 75. This center screw releasably fastens the cover 64 to the base plate 63. To replace the filter cartridge 70 the entire filter with the base plate is unscrewed from a threaded nipple which is not represented here; then the center screw 76 is released and the cover 64 is lifted off from the base plate 63. The filter cartridge 70 can now be removed and replaced with a new filter cartridge. Its installation is performed in the reverse order.

Figure 6A:
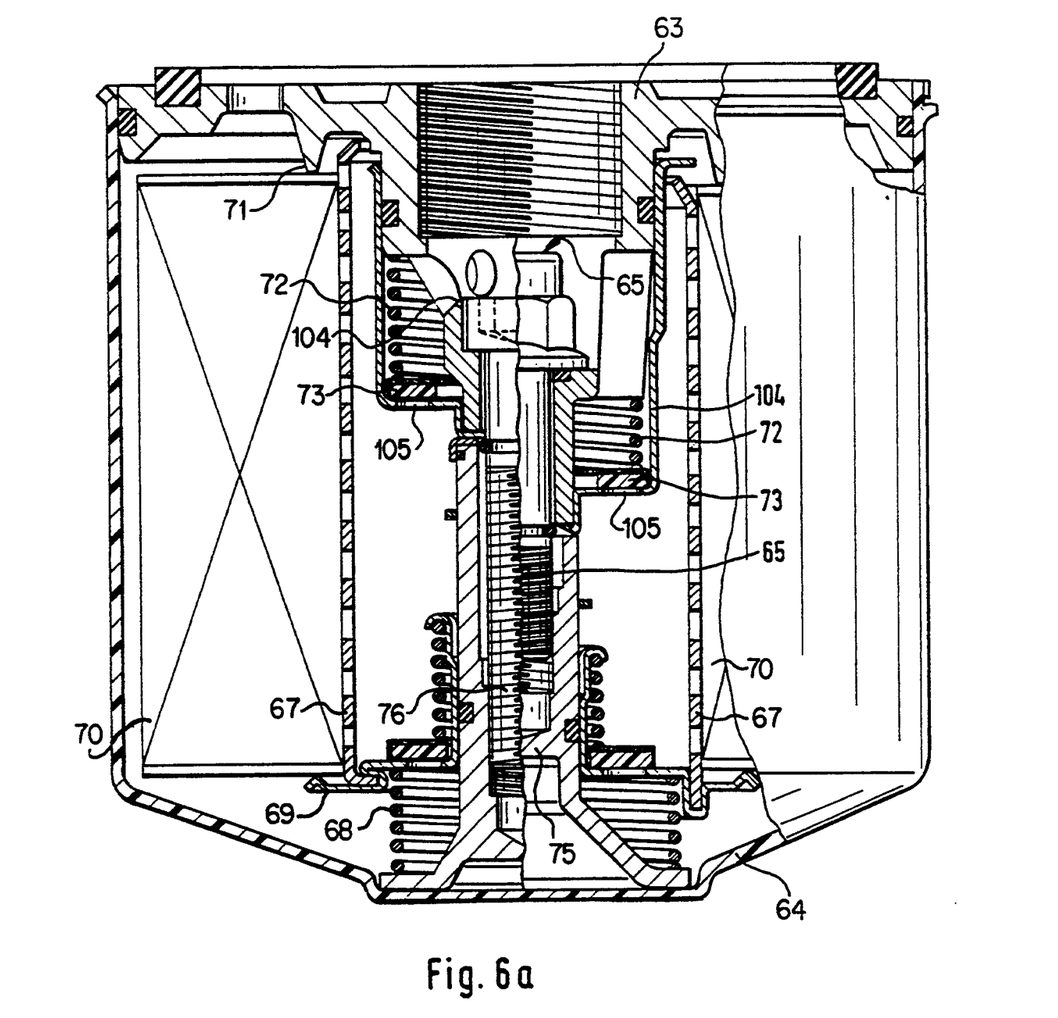
FIG. 6a is a section through a replaceable filter that can be opened

FIG. 6a is a sectional view through a replaceable or exchangeable filter and shows two variants of check valve for the dirty (unfiltered) oil. The basic structure in FIG. 6a comprises, as in FIG. 6, a base plate 63 to which a cover 64 is attached by means of a central thread 65, 76. A central tube 67 is attached to the cover 64 by a system of springs. The filter cartridge 70 is pushed onto this central tube. Due to the spring force of spring 68, which acts against the seating plate 69, the filter cartridge 70 is pressed against the sealing surface 71. A threaded part 75 is provided at the top of the cover 64. The central threads 65, 76 are screwed into this threaded part 75 in each of the two half sections. The cover 64 is releasably attached to the base plate 63 by this central thread. A check valve is arranged in the attachment by means of the central thread both in the right half-section as well as in the left half-section. In each case, this comprises a valve plate 73 each of which closes the oil channel 105 of the valve body 104 via a pressure spring 72.

Figure 7:
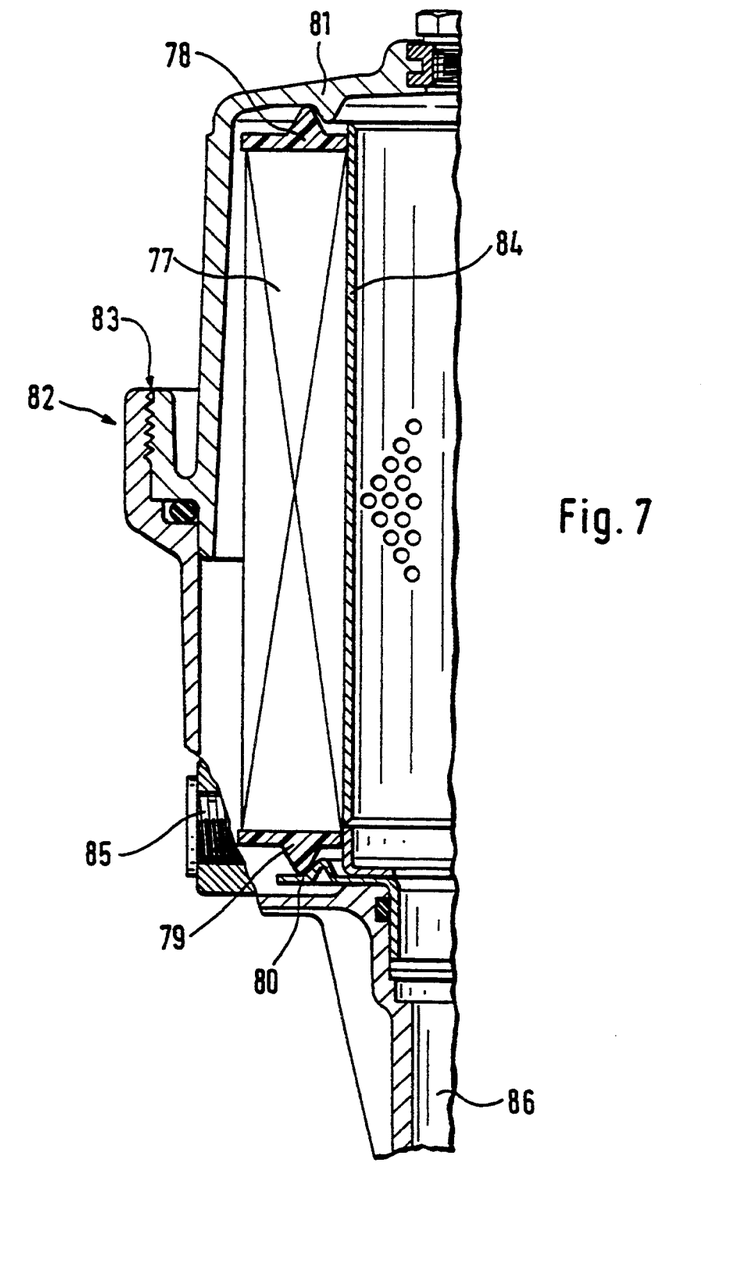
FIG. 7 is a fragmentary section through an oil filter with a self-sealing cartridge.

The filter represented in FIG. 7 is a case filter with a nonmetallic filter cartridge 77 which is provided with silicone rubber end plates 78 and 79. In the bottom part of the filter end plate 79 rests on a resilient sealing piece 80, while in the upper part the silicone rubber end plate 78 is in direct contact with the cover 81 of the filter case. The cover 81 is fastened by screw threads 83 to the filter case 82. After removal of the cover 81 the filter cartridge 77 can be pulled from the center tube 84 and replaced with a new filter cartridge. In the filter here shown, the raw oil inlet 85 is disposed on the side while the clean oil outlet 86 is a central bore.

Figure 8A:
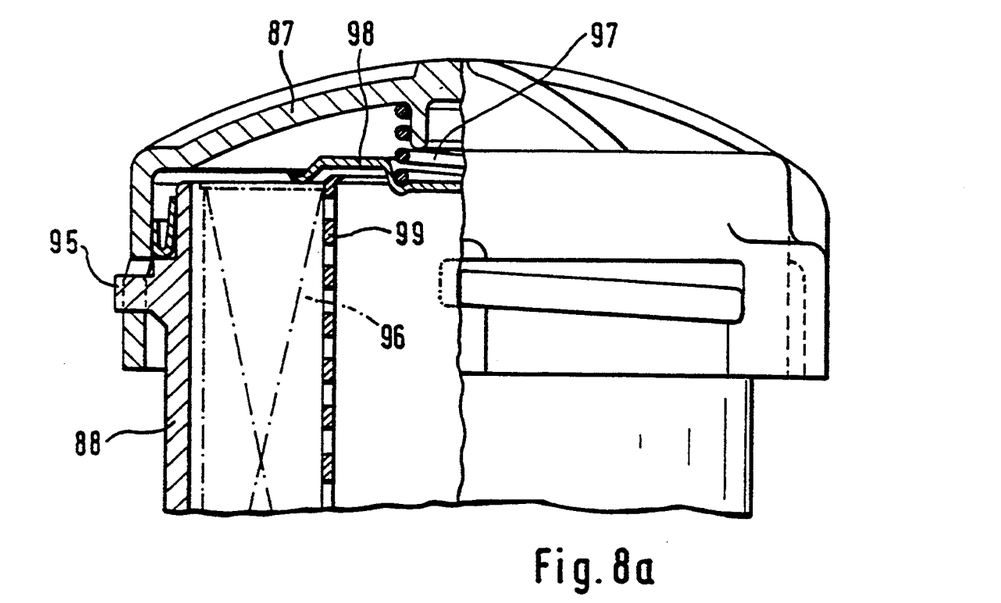
FIG. 8a is a partial fragmentary section of an oil filter case with a bayonet closure.
Figure 8B:
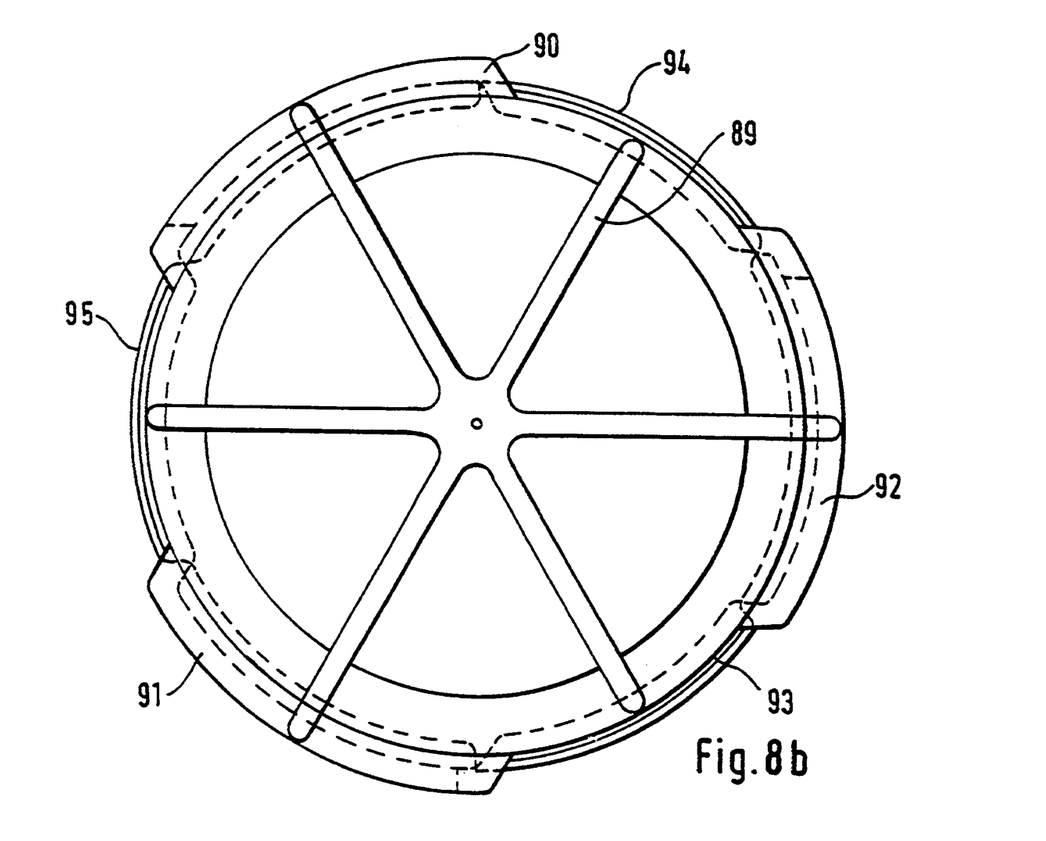
FIG. 8b is a top plan view of the oil filter case of FIG. 8b.

FIGS. 8a and 8b show the bayonet locking of a cover 87 on a case 88. In cased oil filters the cover is often screwed to the case. For easier handling, however, it is preferred to create a bayonet coupling rather than a screw fastening. One such coupling is represented here. The cover is provided with claws 89 and has three recesses 90, 91 and 92 distributed about its circumference. When closing, these recesses are pushed over the bayonet segments 93, 94 and 95 and the cover is locked on the housing by a 60 degree rotation. A compression spring 97 in conjunction with a sealing disk 98 provides for the sealing of the internal filter cartridge 96. The filter cartridge 96 is fixed in its radial position by the center tube 99. To prevent the spontaneous release of the cover the recesses and bayonet segments are ramped in the direction of release.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A filter for fuel or lubricants of an internal combustion engine including a stationary threaded supporting nipple for the filter, comprising:

a base adapted to be secured to said nipple;

a cover releasably joined to said base to define an enclosed space within said filter;

cylindrical support means comprising a projection attached to said base and a support member attached to said cover, said projection including a cylindrical unperforated portion; said support member including a cylindrical perforated portion adjacent said projection and an unperforated portion remote from said projection;

a cylindrical filter insert arranged on said support means and comprising a pleated filter member annularly proximate the central perforated portion of said support means and first and second nonmetallic end plates bonded to said pleated filter member, said filter insert dividing the space within said filter into a raw liquid chamber and a clean liquid chamber;

a first sealing element consisting of an axially extending, integral flange portion of said first nonmetallic end plate of said filter insert, said flange portion of said first nonmetallic end plate covering an axial portion of said filter insert and being in sealing contact with the cylindrical unperforated portion of said projection, and a second sealing element consisting of an axially extending, integral flange portion of said second nonmetallic end plate of said filter insert, said flange portion of said second nonmetallic end plate covering another axial portion of said filter insert and being in sealing contact with the unperforated portion of said support member;

said base being provided with a liquid inlet leading into said raw liquid chamber and with a liquid outlet leading from said clean liquid chamber.

2. A filter according to claim 1, wherein said base plate is provided with threads which mate with threads on said threaded supporting nipple so that the filter can be replaceably screwed onto said nipple.

* * * * *